July 5, 1932.  A. S. HANSEN  1,866,207

AIR DRYING AND PURIFYING APPARATUS

Filed March 27, 1931  2 Sheets-Sheet 1

INVENTOR
Axel S. Hansen
BY
ATTORNEY

July 5, 1932.  A. S. HANSEN  1,866,207
AIR DRYING AND PURIFYING APPARATUS
Filed March 27, 1931  2 Sheets-Sheet 2
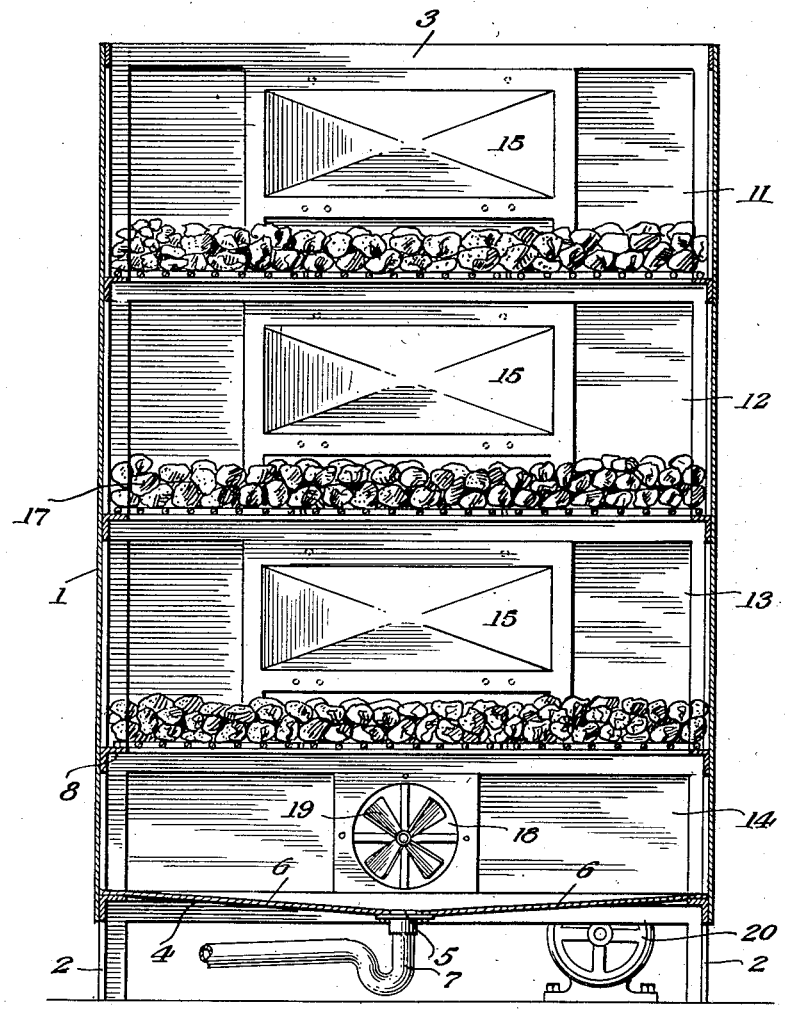
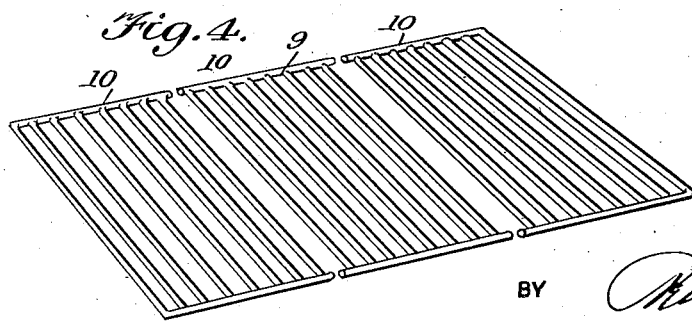
INVENTOR
Axel S. Hansen
BY
ATTORNEY Patented July 5, 1932

1,866,207

UNITED STATES PATENT OFFICE

AXEL S. HANSEN, OF MINNEAPOLIS, MINNESOTA

AIR DRYING AND PURIFYING APPARATUS

Application filed March 27, 1931. Serial No. 525,825.

This invention relates to an apparatus for drying and sterilizing air, and one object of the invention is to provide a simple, reliable and efficient construction of apparatus of this character for use in meat coolers, refrigerating and storage rooms of all kinds wherein goods are to be protected from damage by heat and dampness, whereby air may be deprived of moisture to a determined degree and purified to an effective extent.

Another object of the invention is to provide an apparatus employing means for supporting one or more superposed layers of calcium chlorid or its equivalent in rock form (approximately egg-size) so as to permit free flow of air and moisture therethrough, in combination with means for producing a downdraft of the air to be treated through the layers of calcium chlorid to effectually dry the air and remove all dust or other impurities therefrom.

The invention consists of the features of construction, combination and arrangement of parts, hereinafter fully described and claimed, reference being had to the accompanying drawings, in which:—

Fig. 2 is a horizontal section through the apparatus.

Fig. 4 is a perspective view of one of the gratings.

Figure 1:
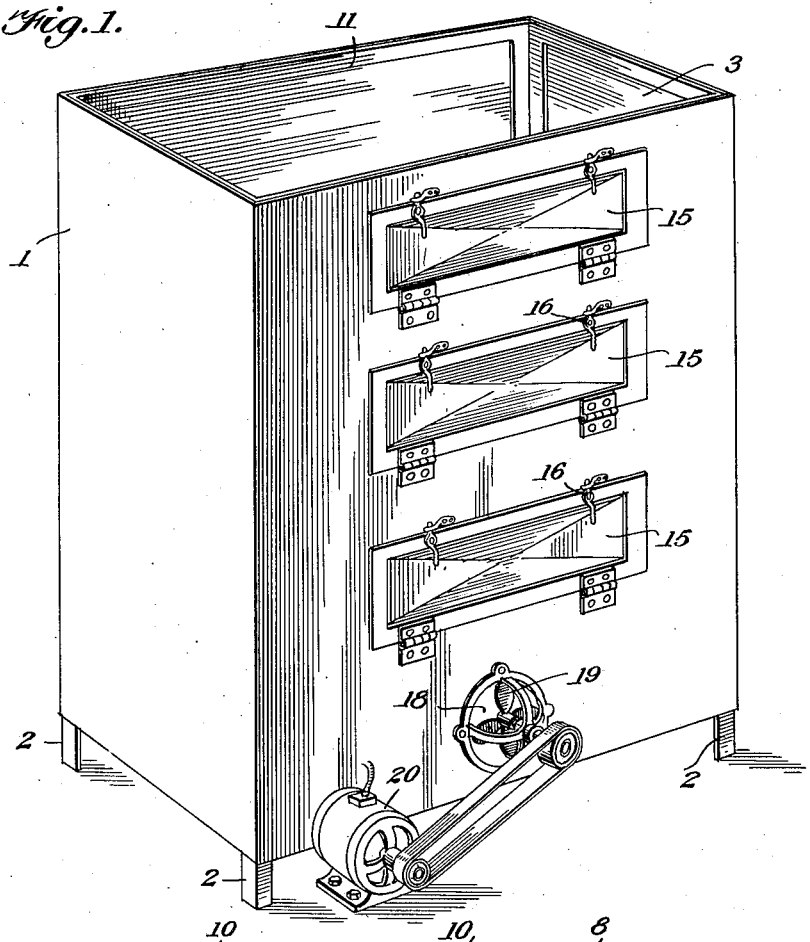
Fig. 1 is a perspective view of an air drying and purifying apparatus embodying my invention.
Figure 3:
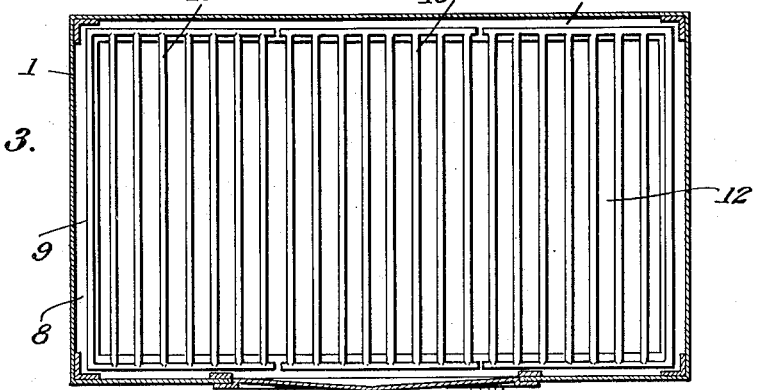
Fig. 3 is a vertical transverse section through the same.

The apparatus comprises a vertically disposed casing 1, of rectangular or oblong rectangular form, and preferably mounted at its base upon supporting feet 2 to hold the same elevated a short distance above the level of the ground or floor surface. This casing is made of sheet metal of suitable thickness and character and is fully open at its top 3 for admission of air thereinto and is provided at its base with an elevated bottom 4. This bottom 4 is formed with a central water outlet 5 and has surfaces 6 sloping in all directions toward said outlet for the rapid flow of the extracted water thereto. Preferably a trap 7, disposed in the space between the bottom 4 and the underlying floor, is provided for connecting the outlet with a suitable drainage pipe and this trap is designed to form a water seal to permit outflow of the water while preventing inlet of air through the water discharge outlet.

The casing is provided on its interior at proper elevations with angle metal brackets or ledges 8 extending around its walls and forming supports for gratings 9, each grating 9 being preferably of rod type and consisting of a series of sections 10, as shown in Fig. 4, adapting the gratings to be readily applied for use and removed for cleaning, repairs or other purposes. These gratings subdivide the interior of the casing into a plurality of superimposed compartments 11, 12, 13 and 14, each, with the exception of compartment 14, provided at the front of the casing with an opening closed by a hinged door 15 normally secured in closed position by suitable latches 16.

Each grating 9 is designed to support a layer 17 of calcium chlorid or other suitable treatment material or agent disposed thereon in loose form. Preferably each layer of treatment material or agent is in rock form or particles about the size of a hen's egg, such particles being placed so as to provide a treatment bed having circuitous passages fully enough open to allow air and water to readily pass through the bed, while at the same time requiring the air or water to take an indirect course and to come in intimate contact with the particles of the treatment material. By employing the calcium chlorid or equivalent agent or treatment material in this form and arranged in layers as set forth, a most efficient dehydrating action and washing action is obtained to dry the air to the exact degree required and to relieve it of dust and other impurities, which will be taken up and carried along with the extracted water and discharged. Such construction and arrangement of the gratings and use of the treatment agent in the form described further prevents packing and undue hardening of this agent on the screens and permits of the ready removal of the screen sections and treatment material thereon through the doors for cleaning of the screen sections whenever occasion requires.

One of the walls of the compartment 4 is provided with an air discharge opening 18 in or adjacent to which is arranged a suction and discharge fan or pump 19, receiving motion from a suitable motor 20. This fan operates in practice to form a partial vacuum in the base part of the casing and to cause air to be drawn downward through the open top 3 and the several compartments 11, 12, 13 and 14, and through the layers of calcium chlorid on the screens and through said screens into the bottom compartment 14, from which the treated air is discharged through the opening 18.

It will be evident from the foregoing that the downdraft current of air passing through the layers of treatment material will be brought into intimate contact with the particles of the material and deprived of its moisture, which moisture will drift downward, carrying with it portions of the calcium chlorid in solution, the resultant article falling upon the sloping surfaces 6 of the bottom 4 and discharging through the outlet opening 5. By this means the air will be dehydrated in a very rapid and efficient manner and supplied in dehydrated form to the refrigerator or other compartment while the water extracted therefrom will be discharged in such manner as to form a seal in the trap 7 and thus provide for the escape of water while preventing access of air through the trap, so that an effective suction action by the fan in the lower compartment 14 may be produced. The result of drawing air downward through the layers of treatment material is to remove the foul air from the top of a room in which the apparatus is arranged and deprive it of its moisture, while purifying it, and discharging all impurities with the water through the outlet trap. The air in a refrigerator or other room may therefore be kept in a suitably dehydrated and purified state so as to prevent injury to its contents and this operation may be carried out in a very simple and effective manner and by means of a type of apparatus which may be supplied and operated at comparatively low cost.

Having thus fully described my invention, I claim:—

An air drying and sterilizing apparatus comprising a casing fully open at the top and having a water outlet at its bottom, a trap associated with the water outlet, a plurality of spaced superposed sectional gratings in said casing subdividing the same into superposed chambers, each chamber having an opening in one of its sides, said gratings serving to support layers of calcium chlorid or an equivalent treatment agent in rock form, doors in the casing closing the openings in the chambers above the bottom one, and a suction and exhaust fan mounted in the opening in the side of the bottom chamber for drawing air downward through the open top of the casing and through the layers of the treatment agent and discharging the dehydrated air through said opening.

In testimony whereof I affix my signature.

AXEL S. HANSEN.